United States Patent [19]

Suita et al.

[11] 4,426,606

[45] Jan. 17, 1984

[54] EMERGENCY STOP DEVICE FOR BRUSHLESS MOTORS

[75] Inventors: Muneo Suita; Kazuo Mogi, both of Ueda, Japan

[73] Assignees: Sanyo Denki Co., Ltd., Tokyo, Japan; Electro-Craft Corp., Hopkins, Minn.

[21] Appl. No.: 439,942

[22] Filed: Nov. 8, 1982

[51] Int. Cl.³ .............................................. H02P 3/12
[52] U.S. Cl. ..................................... 318/375; 318/380; 318/767; 318/759
[58] Field of Search ............... 318/138, 254, 375, 380, 318/381, 378, 362, 377, 379, 696, 753, 756, 757, 759, 762, 763, 764, 766, 767, 768, 769, 376

[56] References Cited

U.S. PATENT DOCUMENTS

| | | | |
|---|---|---|---|
| 3,153,182 | 10/1964 | Shafi-Uddin | 318/759 |
| 3,781,619 | 12/1973 | Rashkovich et al. | 318/377 X |
| 3,852,649 | 12/1974 | Kindgren et al. | 318/767 X |
| 4,189,668 | 2/1980 | Willcock et al. | 318/380 X |

FOREIGN PATENT DOCUMENTS

| | | | |
|---|---|---|---|
| 118580 | 6/1944 | Australia | 318/375 |
| 280043 | 7/1964 | Australia | 318/377 |
| 807641 | 1/1959 | United Kingdom | 318/377 |

Primary Examiner—J. V. Truhe
Assistant Examiner—Shik L. P. Ip
Attorney, Agent, or Firm—Kinney, Lange, Braddock, Westman & Fairbairn

[57] ABSTRACT

Emergency braking device for a brushless motor comprising damping means connected through a switch to the windings of the brushless motor in case of emergency to dissipate the energy stored in the inductance of the windings of the brushless motor. The impedance characteristics of the damper means are optimized by selecting a capacitance which has a predetermined relationship to the inductance of the motor winding.

3 Claims, 4 Drawing Figures

EMERGENCY STOP DEVICE FOR BRUSHLESS MOTORS

BACKGROUND OF PRIOR ART

This invention relates generally to the control of electric motors and, more particularly, to an emergency braking device for brushless electric motors. Emergency braking systems are known to the prior art. Such systems utilize resistive dampers which are connected to the motor windings by a remotely actuated switch in the event of an emergency. The stored energy in the motor windings is dissipated in the resistors to apply a braking effect to the rotor of the motor.

BRIEF SUMMARY OF THE INVENTION

The invention is an improved damping means for use in an emergency braking system for a brushless motor. The system utilizes a damper including both resistance and capacitance means which are selected to have a predetermined relationship to the inductance and resistance of the motor windings to provide optimized braking effects.

DETAILED DESCRIPTION OF THE INVENTION

Figure 1:
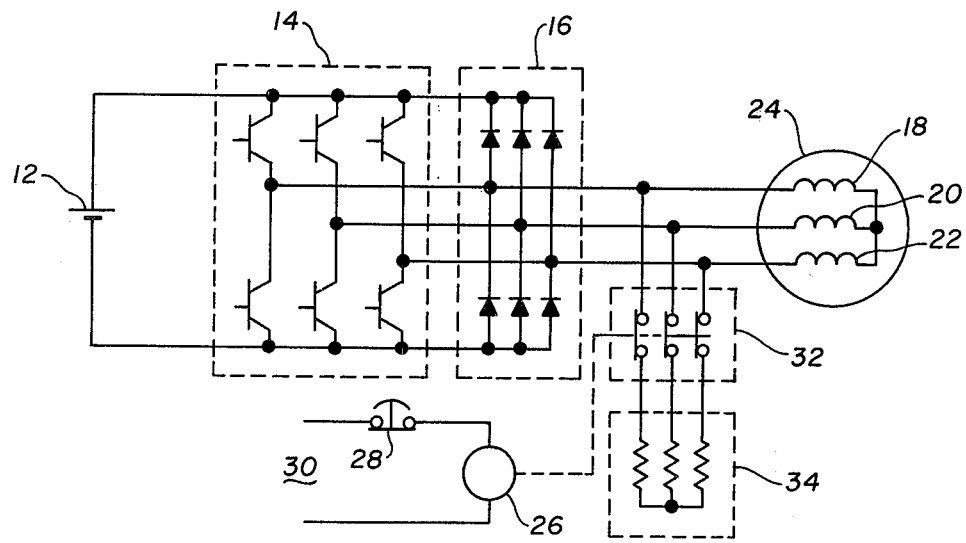
FIG. 1 is a schematic of a prior art emergency braking device for a brushless motor.

The braking device according to this invention is for a brushless motor having a permanent magnet rotor used, for example, in the feed mechanism of a machine tool or the like, in which a damper means is adapted to minimize the further rotation of the motor shaft due to inertia after the generation of an emergency stop signal to commence the stopping of the motor. In FIG. 1, a prior art emergency braking or stopping device for brushless motor is shown. A DC power source 12 energizes a commutation controller circuit 14 and also includes flyback diodes 16 to suppress the inductive switching transient from the individual motor windings 18, 20 and 22 of the motor 24 as the windings are driven sequentially. As shown in FIG. 1, the three windings in the motor are connected in a "star" stator arrangement where each winding is oriented 120 electrical degrees from the other. The six transistors in the commutation circuit 14 are connected to the end points of each stator leg to form the three-phase full wave motor control.

In FIG. 1, the emergency braking device comprises a relay 26, a switch for activating the relay 28 and a power source 30 for the relay winding 26. The relay contacts 32 are connected between the windings 18, 20 and 22 and the prior art damping device 34 which is comprised only of three star-connected resistors R, as shown.

In case of emergency, as for example when the electrical supply 12 is interrupted, the push-button switch 28 is closed to energize the relay winding 26 to thereby close the individual switches of the switch means 32. This results in a connection of the three motor windings 18, 20 and 22 to the star-connected resistors R to dissipate the electromagnetic energy stored in the motor windings and convert it to thermal energy to accomplish dynamic braking of the motor. In some prior art devices, dynamic braking of the motor is accomplished by setting the resistance of the resistors R at zero to short-circuit the windings of the motor.

A problem encountered with such conventional dynamic braking utilizing only resistors is that the continuing rotation of the motor due to inertia after energization of the stopping circuitry results in considerable rotation of the motor shaft and undesirable and excessive movement of the table or head of a machine tool driven by the motor. In order to avoid the necessity of providing the machine tool with a long dead zone, it is desirable to provide an emergency stop circuit for minimizing the excessive rotation of the motor. In typical prior art circuits utilizing only resistive elements in the damping means, a rotor rotation of 240° is not uncommon. In many machine tools, this results in the necessity for providing a dead zone of at least 7 mm at both ends of the table. Such a requirement is not consistent with insuring safety, miniaturization and economization of the machine tool and is to be avoided.

As is well known in the art, the characteristics of a brushless motor during dynamic braking are similar to a synchronous generator of the permanent magnet type. Therefore, when the internal electromotive force induced across the windings of the motor and the current flowing through the windings having a constant impedance are in the same electrical phase relationship, the maximum retarding torque is applied to the shaft of the motor. When the induced emf approaches a phase difference of 90° from the current, the electrical energy consumed by the resistive component of the load impedance is small and the retarding torque is insufficient. As the motor slows down, its angular frequency decreases, and its reactance decreases from a relatively large number to a much smaller number as phase angle between the induced electromotive force across the windings and the current flowing through the windings shifts in the range of plus or minus 90°. This causes the retarding torque applied to the motor shaft to become quite small so that it is impossible using prior art techniques to provide the brushless motor with adequate dynamic braking.

The present invention eliminates the abovementioned disadvantage of the prior art by providing an improved emergency stop device utilizing a damper comprising condensor means and resistor means with values selected such that the impedance of the electrical circuit of the damper means, when combined with the impedance of the motor windings, is low at the angular frequencies representative of the range of speeds of the motor between the maximum speed and the minimum speed to allow a large current to flow through the damper and maximize the braking torque applied to the motor shaft.

Figure 2:
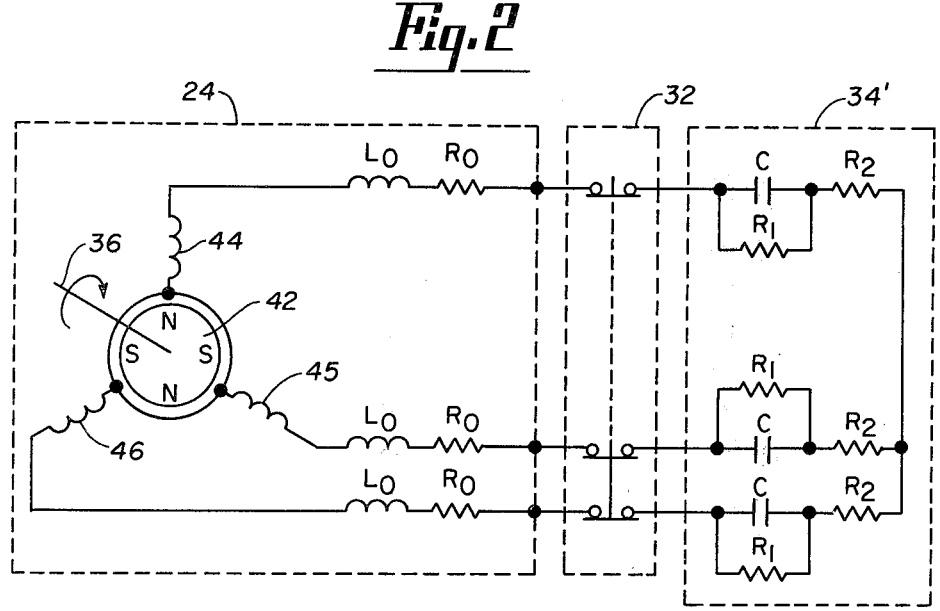
FIG. 2 illustrates the connection of the braking device according to the present invention to a brushless motor.
Figure 3:
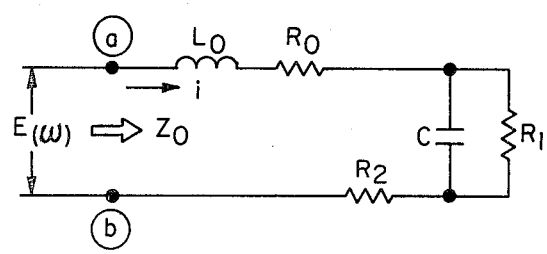
FIG. 3 is a schematic of a single winding of the motor and damper.
Figure 4:
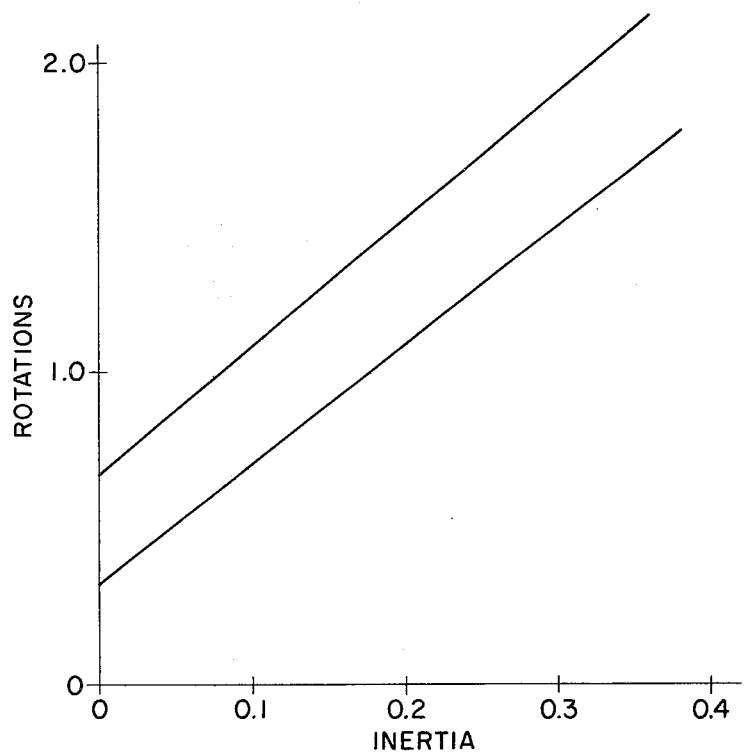
FIG. 4 is a chart comparing the braking characteristics of a prior art damping device to a damping device according to the present invention.

The present invention is explained in detail in conjunction with the illustrative embodiment shown in FIGS. 2 through 4. Referring first to FIG. 2 which shows an electrical circuit for explaining the dynamic braking of the motor 24, the motor 24 includes an output shaft 36 directly connected at one end thereof to a rotor 42 having a four-pole permanent magnet as a part thereof and mechanically connected at the other end thereof to a feed shaft of a machine tool which is not shown. At the time of dynamic braking, the brushless motor 24 operates as a generator driven by the rotational energy stored in the rotary inertia of the motor, rotor and the feed shaft of the mechanical tool. The mechanical inertia is changed to electrical energy and then to thermal energy by the damper means 34' so that the rotational energy may be rapidly dissipated to allow the motor to be stopped. In FIG. 2, the rotation of rotor 42 of the motor causes a three-phased AC voltage to be induced across the three-phase stator windings 44, 45 and 46 and supplied through internal inductances L0 and R0 of windings 44, 45 and 46 through the closed contacts of switch 32 to a damper 34 according to the present invention. Damper 34 includes, in each leg of the star connection, a capacitor C, a resistor $R_1$ in parallel with capacitor C and a resistor $R_2$ in series with the parallel combination of C and $R_1$.

FIG. 3 shows an electrical circuit representing a single phase of the three-phase AC circuit of FIG. 2 as an equivalent circuit. In FIG. 3, an AC voltage $E(\omega)$ represents the induced electromotive force which has a particular magnitude and has an angular frequency $\omega$ proportional to the rotational speed of the rotor 42. When the motor is rotated at a high speed, the AC voltage has a high voltage value and a high angular frequency $\omega$. The impedance $Z_0$ between terminals a and b includes a resistance component and a reactance component. The current which would flow into the impedance is determined dependent upon the AC voltage e and the impedance $Z_0$.

In order to accomplish effective dynamic braking of the motor, it is required to decrease the impedance $Z_0$ to allow a large current to flow therethrough and to hold the phase of the AC voltage e to that of the current I as close as possible at the relatively high rotational speed region of the motor operating characteristics so that the resistance component of the impedance $Z_0$ may consume as large a portion of the thermal energy as possible.

In view of the foregoing, in the braking or damping means 34' of the present invention, the optimum value of the condensors C and the optimum resistance of the resistors $R_1$ and $R_2$ are determined with respect to the motor winding inductance $L_0$ to minimize the reactance component of the impedance $Z_0$ to thereby allow the impedance $Z_0$ to be maintained low and hold the phase of the induced voltage e to track the phase of the current I as close as possible in the high rotational speed region of the motor operating characteristics. Thus, the impedance seen at high rotational speeds is low, but increases at low rotational speeds. However, at low rotational speeds, the rotation of the motor due to inertia is low so that stopping of the motor in the low speed region is readily accomplished.

FIG. 4 illustrates the comparison between braking utilizing a damper 34' according to the present invention compared to braking utilizing prior art resistive dampers as shown in damper 34 of FIG. 1. In both instances, a four-pole brushless motor rotating at the speed of 1500 rpm was stopped in the upper curve. The conventional damper allows the motor to make approximately 240° of rotation at zero-load inertia, while the improved damper 34' according to the present invention allows approximately 120° of rotation at the same inertia level. At increasing inertias, similar beneficial results are observed utilizing the improved damper.

The different in dynamic braking effect of the damper means according to the present invention with respect to the conventional damper means becomes smaller as the load inertia becomes larger. However, in view of the difference of 120° rotation and dynamic braking effect between them and assuming use of the system in a machine where the feed screw has a pitch of 10 mm, it is possible to shorten the length of the dead zone of each end of a table and the length of the feed screw at least 3.3 mm and 6.6 mm, respectively. This results in enhanced safety, miniaturization and economization of the machine tool.

Of course, the emergency stop device according to the present invention is also applicable to brushless motors used to drive a spindle of a machine tool or the like, because it allows the rotation of the motor due to inertia to be minimized. Similarly, it will be realized that the switch 28 and the switch contacts 32 can be mechanized from semiconductor or analogous elements. It will also be realized that the principles of the present invention are applicable to single phase four-pole and other forms of brushless motor commutation circuits without departing from the scope of the present invention.

What is claimed is:

1. In a brushless motor control system including a power source connected to the windings of a brushless motor for supplying power thereto, improved damper means for connection to the windings for dissipating the energy stored therein comprising, in combination:
   first resistance means for dissipating energy stored in the winding of the motor;
   second resistance means in series with said resistance means; and
   capacitance means connected in parallel with said first resistance means constructed and arranged for combination with said first resistance means and said second resistance means for minimizing the impedance of said damping means at high motor rotation rates and increasing the impedance of the damping means at low rotational rates to optimize the deceleration of said brushless motor when said damper means is connected to the motor windings.

2. The invention of claim 1 wherein switching means are provided for connecting said damper means to the windings of said brushless motor and for disconnecting said power source from said windings in response to a stop command.

3. The invention of claim 1 wherein the inductance of said motor winding is $L_0$ and the magnitude of said first and second resistance means and said capacitance means are selected to minimize the reactance component of the total series impedance of the winding and the damper means, thereby providing a low impedance load at high rotational speeds and a higher impedance loads at low rotational speeds.

* * * * *